United States Patent [19]

Heydrich

[11] Patent Number: 5,031,922
[45] Date of Patent: Jul. 16, 1991

[54] BIDIRECTIONAL FINGER SEAL

[75] Inventor: Hans Heydrich, Phoenix, Ariz.

[73] Assignee: Allied-Signal Inc., Morris Township, Morris County, N.J.

[21] Appl. No.: 454,498

[22] Filed: Dec. 21, 1989

[51] Int. Cl.[5] .............................. F16J 15/447
[52] U.S. Cl. ....................... 277/53; 277/193; 415/174.5
[58] Field of Search ................. 277/53, 58, 96.1, 152, 277/153, 193, 236, 235; 415/173.1, 173.3, 173.5, 174.2, 174.5

[56] References Cited

U.S. PATENT DOCUMENTS

| | | |
|---|---|---|
| Re. 30,206 | 2/1980 | Ferguson et al. .................. 277/53 X |
| 885,032 | 4/1908 | De Ferranti . |
| 2,124,108 | 7/1938 | Grece . |
| 2,233,579 | 3/1941 | Bowers ........................ 277/235 R X |
| 2,571,817 | 10/1951 | Armstrong . |
| 2,699,349 | 1/1955 | Brownlee . |
| 3,199,878 | 8/1965 | Cunningham et al. . |
| 3,381,969 | 5/1968 | Crow et al. . |
| 3,411,794 | 11/1968 | Allen . |
| 3,460,842 | 8/1969 | Pointer et al. ...................... 277/53 X |
| 3,719,365 | 3/1973 | Emmerson et al. . |
| 3,744,805 | 7/1973 | Heinrich ............................ 277/96.1 |
| 3,843,278 | 10/1974 | Torell . |
| 3,880,435 | 4/1975 | Thronbald . |
| 3,970,319 | 7/1976 | Carroll et al. . |
| 4,415,317 | 11/1983 | Butterworth .................. 277/96.1 X |
| 4,645,217 | 2/1987 | Honeycutt et al. . |
| 4,678,113 | 7/1987 | Bridges et al. . |
| 4,696,480 | 9/1987 | Jörnhasen ............................. 277/53 |
| 4,756,536 | 7/1988 | Belcher . |
| 4,770,424 | 9/1988 | Otto .................................. 277/53 X |
| 4,781,530 | 11/1988 | Lauterbach et al. ............. 415/173.1 |

FOREIGN PATENT DOCUMENTS

| | | |
|---|---|---|
| 554053 | 7/1932 | Fed. Rep. of Germany . |
| 626541 | 9/1934 | Fed. Rep. of Germany ........ 277/53 |
| 1300449 | 12/1962 | France . |
| 1308424 | 2/1963 | France . |
| 2021209 | 11/1979 | United Kingdom ................. 277/53 |

OTHER PUBLICATIONS

Technical Paper entitled "Brushes as High Performance Gas Turbine Seals" by J. G. Ferguson.

Primary Examiner—William A. Cuchlinski, Jr.
Assistant Examiner—Scott Cummings
Attorney, Agent, or Firm—Terry L. Miller; Jerry J. Holden; Robert A. Walsh

[57] ABSTRACT

An annular shaft seal apparatus of the labyrinth type includes at least two pair of axially stacked thin annular diaphragm members. Each of the diaphragm members includes an annular array of radially and circumferentially extending finger portions defining gaps therebetween. The diaphragms of each pair are so disposed that the fingers of each block the gaps of the other. One of the pairs of diaphragm members is right-handed with respect to circumferential angulation of the finger portions, while the other pair is left-handed. Thus, sealing integrity is maintained by the finger portions regardless of the direction of shaft rotation.

6 Claims, 2 Drawing Sheets

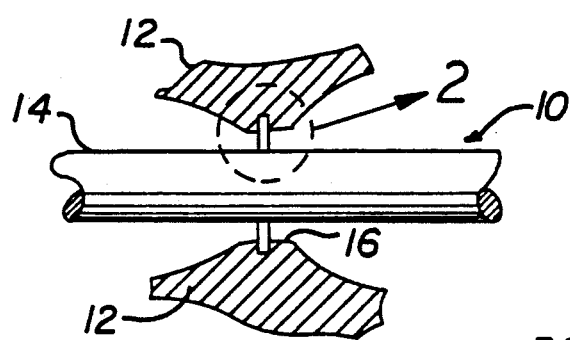
FIG. 1
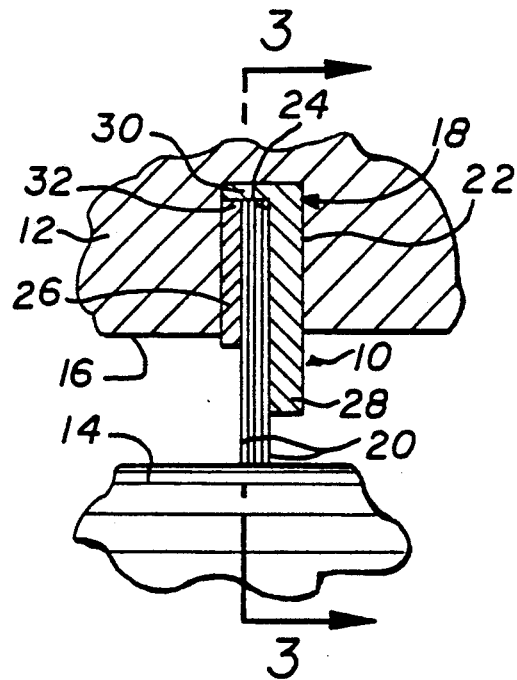
FIG. 2
FIG. 3
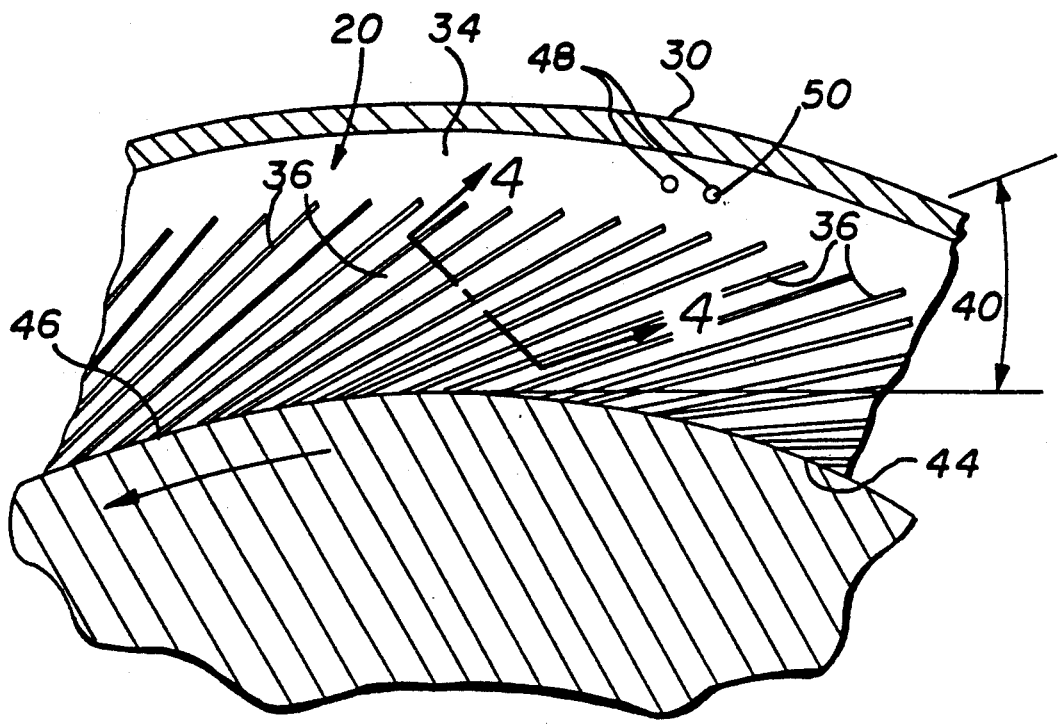

BIDIRECTIONAL FINGER SEAL

The United States Government has rights in the present invention pursuant to Contract No. F33657-86-C-2008, issued by the United States Air Force.

The present invention is in the field of sealing apparatus and method disposed in association with two relatively rotatable members and providing a fluid seal therebetween. More particularly, the present invention relates to a method and apparatus for achieving a fluid seal between a rotatable shaft and a housing circumscribing the rotatable shaft and defining a running clearance therewith.

Sealing members, or fluid packing, of the so called brush type for use at the interface of a housing and rotatable shaft have been known for a long time. For example, U.S. Pat. No. 885,032, issued to S. Z. De Ferranti on 21 April 1908 (hereinafter, the '032 patent), is believed to teach a fluid packing or brush seal for use in an elastic turbine wherein a plurality of elongate filaments or fibers are clustered together and secured to one of a pair of relatively movable members for sliding contact with the other member. The resulting "brush" seal functions rather like a labyrinth or multi baffle seal to inhibit fluid flow between the pair of relatively movable members. The '032 patent teaches that the brush seal may be made of metallic filaments or wire, for example, carried by one of the members and may be arranged as a radial or axial seal with a smooth or grooved engagement surface on the other of the pair of members. Consequently, the brush seal of the '032 patent is able to withstand high temperaturs encountered in steam turbines or combustion turbine engines.

A more recent example of the brush seal is taught by U.S. Pat. No. 4,678,113, issued 7 July 1987, to S.A. Bridges and J. Goddard, (hereinafter the '113 patent). The '113 patent is believed to teach a brush seal wherein a plurality of filaments are adhesively intersecured to form a tuft. A plurality of tufts are assembled closely adjacent one another in a support member with part of each tuft projecting therefrom. The adhesive is removed from the projecting part of each tuft to leave the filaments individually movable and engageable with a rotatable shaft, for example. Again, the filaments may be made of wire so that the brush seal is suitable for high temperature applications.

Finally, a brush seal of multiple stages is taught by U.S. Pat. No. 4,756,536, issued 12 July 1988 to Bryan L. Belcher, (hereinafter, the '536 patent). This patent is believed to provide a multistage brush seal for use in a turbine engine wherein the fluid pressure differential imposed across the seal would result in the last seal stage allowing excessive leakage flow.

Each of the teachings of the '032, '113, and '536 patents proposes to use plural elongate filaments in making of the brushes of a brush seal. While the techniques and industry for making general purpose brushes at high volume and low cost are well advanced, brush seals remain fairly expensive. This may be the case because the manufacturing techniques for general purpose brushes are not fully applicable to brush seals. On the other hand, the historically low volume use of brush seals may not economically justify adaptation of high-volume, low-cost manufacturing equipment from the general brush field to the seal making industry. Regardless of the economic and technical reasons, brush seals have not generally been available at a competitive cost.

A further consideration with conventional brush seals in their inability to tolerate reverse rotation of the shaft member. That is, because the brush filaments extend radially and circumferentially between the housing and shaft at an acute angle with the radial, reverse rotation of the shaft member causes the brush filaments to grab or dig into the shaft member. Such action, if the reverse torque is sufficient, can result in damage to the shaft or buckling and bending of the filaments. In either case, sealing effectiveness may be lost because of shaft damage or because bent filaments interfere with the sealing engagement of other intact filaments as well as opening gaps in the labyrinth of the brush.

In view of the above, it is an object for this invention to provide a brush-like seal which admits of manufacture by modern low-cost techniques.

Another object of the present invention is to provide a brush-type seal which permits bidirectional rotation of the shaft member.

Accordingly, the present invention provides an annular sealing apparatus for disposition in sealing cooperation with a body defining a bore and a rotatable shaft received in said bore, said sealing apparatus including two pair of axially adjacent annular diaphragm members carried by said body and circumscribing said shaft member, each of said diaphragm members including a respective radially outer circumferential band portion and a circumferential plurality of radially and circumferentially extending finger portions integral with said band portion and extending therefrom to each terminate in a respective radially disposed end surface which slidably engages said shaft member, said finger portions being circumferentially spaced to define an array of axially extending gaps therebetween, and each pair of diaphragm members being circumferentially indexed so the finger portions of each block the gaps of the other, and the finger members of said first pair of diaphragm members being angulated circumferentially in a sense opposite to those of said second pair of diaphragm members.

FIG. 1 depicts a longitudinal view, partially in cross-section, of a sealing apparatus embodying the invention;

FIG. 2 depicts an enlarged fragmentary sectional view of an encircled portion of FIG. 1;

FIG. 3 depicts a transverse sectional view taken along line 3-3 of FIG. 2:

Figure 4:
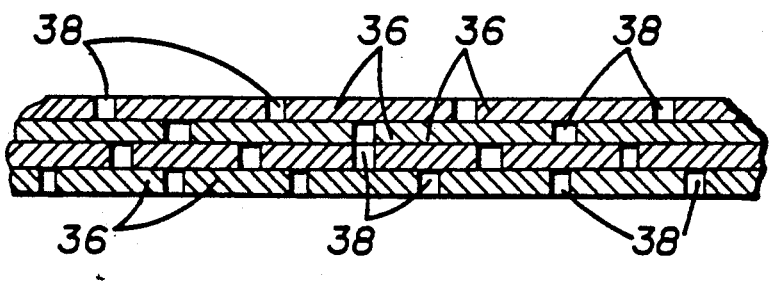
Figure 5:
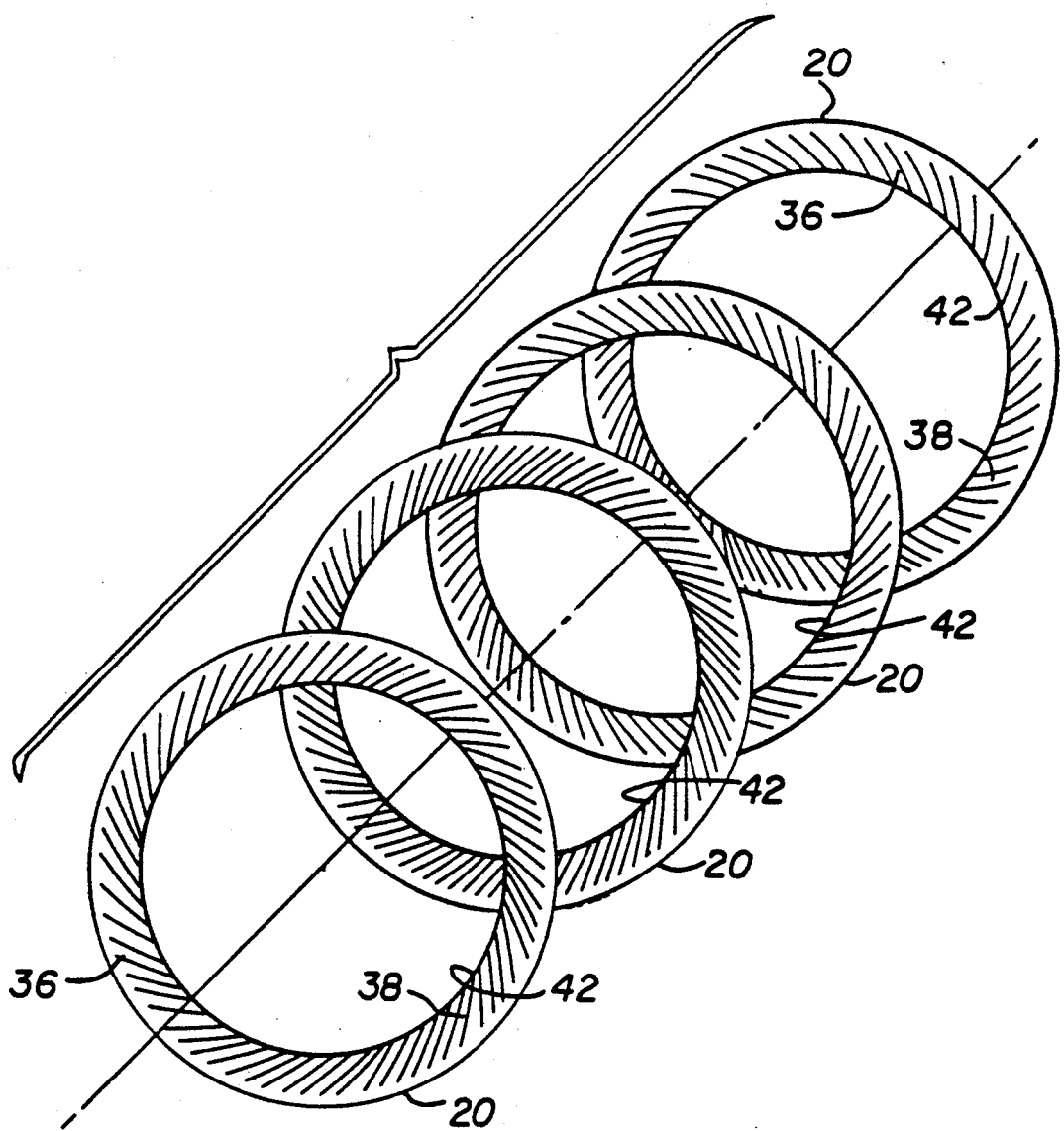

FIG. 4 provides an enlarged fragmentary cross-sectional view taken along line 4-4 of FIG. 3;

FIG. 5 is a fragmentary exploded perspective view of four component parts of a bidirectional seal embodying the invention.

Viewing FIGS. 1-5 in conjunction, FIG. 1 shows a sealing apparatus generally referenced with the numeral 10. The sealing apparatus 10 is disposed in cooperation with a body 12 and a rotatable shaft 14 to provide a fluid seal therebetween. Particularly, the body 12 defines a bore 16 through which passes the rotatable shaft 14. The sealing apparatus 10 is carried by the body 12 at bore 16 and encircles the shaft 14 in sealing tight relatively movable relation therewith.

FIG. 2 shows that the sealing apparatus 10 includes an annular housing 18 which is carried by body 12 and extends toward but short of shaft 14. Carried within the housing 18 is a plurality of thin annular metallic diaphragm members 20. The housing 18 includes a first annular portion 22 which is L-shaped in cross-section to define a recess 24. Received in recess 24 is the plurality of diaphragm members 20. Also received in recess 24 is a second planar annular portion 26. Portion 22 includes a first radially extending leg 28 parallel with portion 26, and an axially extending leg 30 encircling the diaphragm members 20 and second portion 26. At a radially outer margin 32 of the second portion 26, the portions 22 and 26 are welded together to trap the diaphragm members 20 therebetween.

The diaphragm members 20 each extend to and slidably engage the shaft member 14, viewing FIGS. 2 and 3 in particular. As seen in FIGS. 3 and 5, each diaphragm member includes a circumferentially continuous band portion 34 which is parallel the radially extending leg 28 of housing portion 22. The diaphragm members 20 each define an integral plurality of circumferentially uniformly arrayed finger portions 36. The finger portions are comb-like and are circumferentially spaced apart to define a gap 38 therebetween. These finger portions also extend radially and angularly in a single circumferential direction to define an angle with the tangential, which angle is referenced with the numeral 40. That is, the finger portions 36 extend radially inwardly from the band portion 34 generally like a comb toward the shaft with a left-hand or right-hand circumferential angulation. As seen in FIG. 3, the finger portions 36 have a left-hand angulation, as can be seen also in FIG. 5. However, if viewed axially from the opposite side, the diaphragm member 20 would present finger portions with a right-hand angulation, as can be seen of the more distant diaphragm members in FIG. 5. Also, the gaps 38 are narrower than the fingers 36. In their unrestrained positions, as depicted in FIG. 5, the finger portions 36 cooperatively define an inner diameter, referenced with the numeral 42, which is slightly less than the outer diameter of shaft 14.

Consequently, when the diaphragm members 20 are received about the shaft 14, each finger 36 is deflected slightly from its unrestrained position to lightly press an arcuate end edge surface 44 against the outer surface 46 of shaft 14. As is easily appreciated, when shaft 14 rotates leftwardly (counterclockwise, viewing FIG. 3), the tangential friction force at surface 46 provides a moment to finger portion 36 tending to decrease the perpendicular contact force between the surfaces 44, 46. Thus, the shaft 14 is rotatable counterclockwise with the finger portions 36 maintaining a smooth sliding contact with surface 46. On the other hand, should the shaft 14 rotate clockwise, the frictional force adds to the perpendicular force. However, the angle 40 is chosen in view of the bending strength of the finger portions and the coefficient of friction at surfaces 44, 46 so that a smooth sliding contact is maintained at surfaces 44, 46 regardless of the direction of rotation of shaft 14. That is, the fingers 36 do not dig into or grab the shaft 14 regardless of rotational direction of the latter.

Each of the plural diaphragm members 20 defines a pair of circumferentially spaced indexing apertures 48. The spacing between apertures 48 is an odd integer multiple of one-half the circumferential spacing of fingers 36. Consequently, axially adjacent diaphragm members may be circumferentially alternated by passage of a single indexing pin 50 through alternate ones of the pair of indexing apertures. The indexing pin 50 is also received in a retention hole, not shown, in each of the housing portions 22 and 26 to prevent relative rotation of the diaphragm members 20.

FIG. 4 illustrates the advantageous cooperative effect of the indexed circumferential orientation of adjacent diaphragm members 20. It is easily seen that because the gaps 38 are considerably narrower circumferentially than are the finger portions 36, the gaps of each diaphragm member are blocked axially by the finger portions of the axially next adjacent diaphragm member. Consequently, the axially successive finger portions act as a labyrinth seal to inhibit axial passage of fluid.

FIG. 5 shows that the axial stack of diaphragm members 20 preferably includes a pair of left-hand diaphragms, and a pair of right-hand diaphragms. It will be recalled that the diaphragms 20 are left-handed or right-handed dependent upon which axial side is viewed. Therefore, all four of the diaphragms 20 of FIG. 5 are the same, with one adjacent pair being flipped over with respect to the other adjacent pair of diaphragms During rotation of the shaft 14 in either direction, it is believed that a thin fluid dynamic film will form at surfaces 44, 46 so that wear of the fingers 46 and grooving of shaft 14 will be minimal. Also, the radial compliance of the finger portions 36 is sufficient to easily accommodate all vibratory excursions or maneuver load deflections of shaft 14. Because the stack of diaphragms includes two left-handed and two right-handed diaphragms in cooperative pairs, any detrimental transitory effect on either pair occasioned by shaft rotation in either direction does not diminish the effectiveness of seal 10. That is, should the finger members of the left-handed diaphragms skitter or vibrate, for example, as a result of right-handed (clockwise) shaft rotation, the right-handed pair of diaphragms 20 will preserve sealing integrity. The same is true if the finger members of the left-handed diaphragms skitter or vibrate because of counter-clockwise shaft rotation.

In order to form the diaphragm members 20 a laser cutting or chemical photoetching process may be employed. In either case, the laser cutting or photoetch process may directly accept design information from a CAD/CAM system. The result is a seal apparatus which may be produced from design parameters and information in a short time and with very little or no specialized tooling. Those component parts of the seal apparatus which are not made by the photoetch process, for example, the housing portions 22 and 26, can be inexpensively made with standard tooling.

What is claimed is:

1. Annular sealing apparatus for disposition in cooperation with a body defining a bore and a shaft member rotatably received in said bore to inhibit fluid leakage therebetween, said sealing apparatus comprising an axial stack of diaphragm members, said stack including a first pair and a second pair of diaphragm members, each diaphragm member including a comb-like plurality of uniformly spaced and angulated integral finger members circumscribing said shaft member, each finger member being of substantially the same width and said pluralities defining respective uniform gaps between adjacent finger members, an end surface of each of said finger members sealingly and movably engaging said shaft member, and said pluralities of finger members of each diaphragm pair being so disposed that the fingers of each block the gaps of the other, and said first pair and said second pair of diaphragm members having opposite circumferential angulations of said finger members thereof.

2. The invention of claim 1 further including an annular housing defining a recess wherein is received a radially outer portion of said first and second pairs of diaphragm members.

3. The invention of claim 2 wherein said body carries said housing.

4. The invention of claim 1 wherein each of said diaphragm members includes a respective annular band portion which is circumferentially continuous and integral with the finger members of the respective member.

5. The invention of claim 1 wherein said finger portions each define a width dimension at least twice the gap dimension, said finger portions generally being aligned with the gaps of the adjacent diaphragm member of a pair to define with the finger members thereof a labyrinth seal circumscribing said shaft member and inhibiting flow of fluid therethrough.

6. An annular sealing apparatus for disposition in sealing cooperation with a body defining a bore and a rotatable shaft received in said bore, said sealing apparatus including two pair of axially adjacent annular diaphragm members carried by said body and circumscribing said shaft member, each of said diaphragm members including a respective radially outer circumferential band portion and a circumferential plurality of radially and circumferentially extending finger portions integral with said band portion and extending therefrom to each terminate in a respective radially disposed end surface which slidably engages said shaft member, said finger portions being circumferentially spaced to define an array of axially extending gaps therebetween, and the diaphragms of each pair of diaphragm members being circumferentially indexed so the finger portions of each block the gaps of the other, and the finger members of said first pair of diaphragm members being angulated circumferentially in a sense opposite to those of said second pair of diaphragm members.

* * * * *